(12) United States Patent  
Chan et al.

(10) Patent No.: US 8,167,320 B2
(45) Date of Patent: May 1, 2012

(54) VEHICLE WITH CARRIAGE ANTI-TILTING STRUCTURE

(75) Inventors: Chen Yuet Chan, Kowloon (HK); Siu Wa Wong, Kowloon (HK)

(73) Assignee: Jia Bin LI, Fo Shan, Guang Dong Province (CN)

( * ) Notice: Subject to any disclaimer, the term of this patent is extended or adjusted under 35 U.S.C. 154(b) by 84 days.

(21) Appl. No.: 12/786,786

(22) Filed: May 25, 2010

(65) Prior Publication Data

US 2011/0074181 A1    Mar. 31, 2011

(51) Int. Cl.
*B62D 37/00* (2006.01)
*B61D 15/00* (2006.01)

(52) U.S. Cl. .................. 280/6.15; 105/164

(58) Field of Classification Search ........... 180/274; 280/6.15, 6.154; 296/35.1; 105/164, 168, 105/171, 238.1
See application file for complete search history.

(56) References Cited

U.S. PATENT DOCUMENTS

| | | | | |
|---|---|---|---|---|
| 700,102 A * | 5/1902 | Thompson | ............... | 296/35.1 |
| 905,985 A * | 12/1908 | Clove | ............... | 56/209 |
| 1,821,271 A * | 9/1931 | Musgrove et al. | ......... | 280/6.154 |
| 2,174,324 A * | 9/1939 | Janeway | ............... | 105/199.2 |
| 3,575,454 A * | 4/1971 | Meeker | ............... | 293/127 |
| 3,589,466 A * | 6/1971 | Dudley | ............... | 180/232 |
| 3,831,998 A * | 8/1974 | Hewitt | ............... | 296/35.2 |
| 4,446,093 A * | 5/1984 | Mattson | ............... | 264/315 |
| 6,131,520 A * | 10/2000 | Dull | ............... | 105/199.2 |
| 2003/0075071 A1* | 4/2003 | Fleury et al. | ............... | 105/198.2 |

FOREIGN PATENT DOCUMENTS

| | | |
|---|---|---|
| CN | 1040175 A | 3/1990 |
| CN | 1539719 A | 10/2004 |
| CN | 1676398 A | 10/2005 |
| CN | 1911717 A | 2/2007 |
| GB | 191126228 A | 0/1912 |

* cited by examiner

*Primary Examiner* — Joseph Rocca
(74) *Attorney, Agent, or Firm* — Rabin & Berdo, PC

(57) ABSTRACT

A vehicle with carriage anti-tilting structure, which comprises a frame and, a carriage of a cylindrical shape, with its central axis in parallel along the length of the vehicle and is connected with the frame in a free rotation state. The rotating axis of the carriage is the central axis of the carriage, and the gravity center of the carriage is lower than the rotating axis. An electrical locking mechanism for stopping the rotation of carriage is arranged between the carriage and frame, and is connected with a vehicle tilting angle detector which installed on the frame. The locking mechanism acts as an actuator of the vehicle tilting angle detector. In the event of tilting of the vehicle, the vehicle tilting angle detector detects the tilting condition, and then output signal to the electrical locking mechanism, which releases the locking of the carriage and enables it to stay leveled.

2 Claims, 1 Drawing Sheet

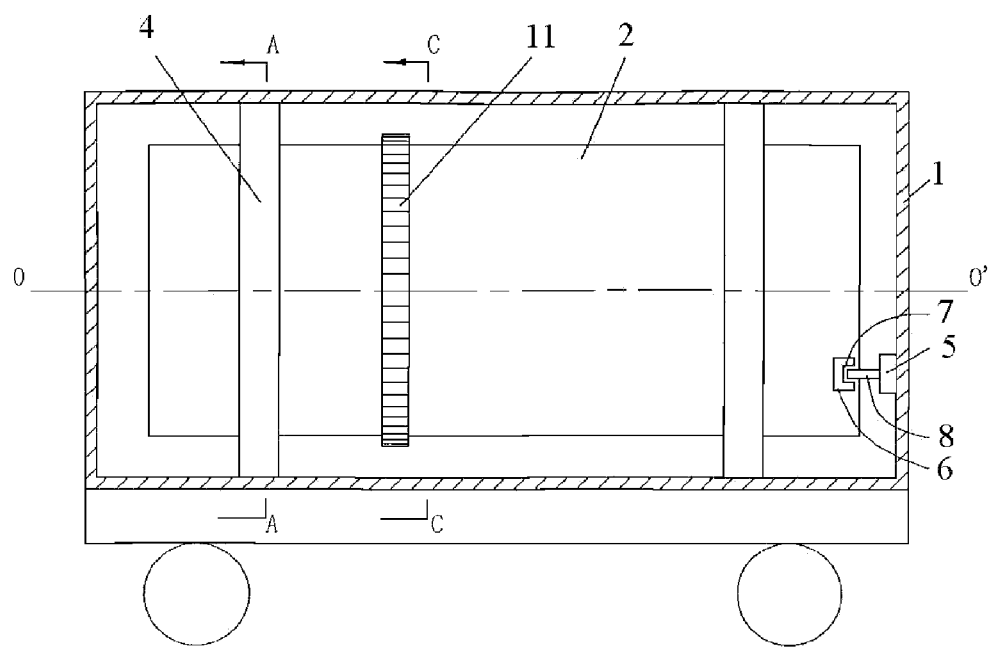
Fig. 1
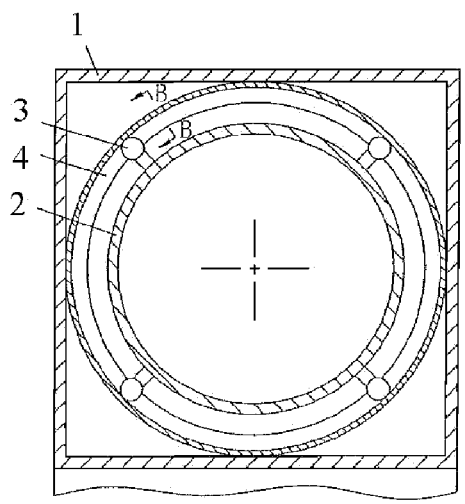 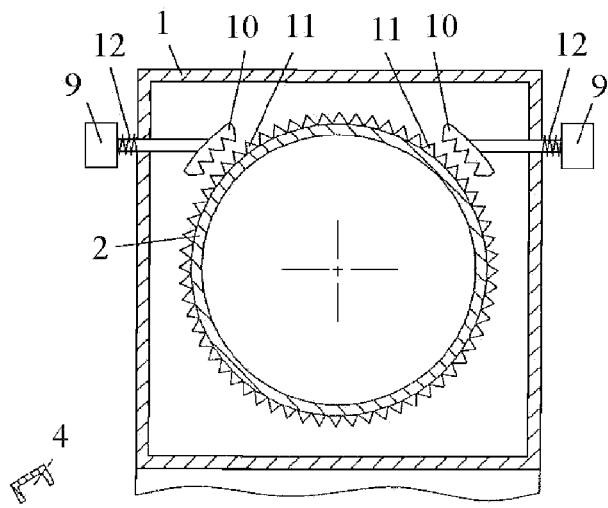
Fig. 2  Fig. 3  Fig. 4

VEHICLE WITH CARRIAGE ANTI-TILTING STRUCTURE

BACKGROUND OF INVENTION

1. Field of the Invention

The present invention relates to a vehicle structure.

2. Description of Related Art

Currently, there lacks an effective method for preventing vehicle carriage from tilting. Although there have been many designs or application for preventing the tilting of vehicle, however, they all lack the practical usage for everyday driving. Furthermore, due to complex road conditions, preventing a running vehicle from tilting is very difficult, especially for large vehicles.

SUMMARY OF THE INVENTION

The primary objective of the present invention is to provide a vehicle with a carriage tilting prevention structure even in the case of overturn of the entire vehicle.

The present invention involves a vehicle with carriage anti-tilting structure which comprises: a frame and a carriage; the carriage is of cylindrical shape, with its central axis in parallel along the length of the vehicle. The carriage is connected to the frame and can be freely rotated. The rotating axis of the carriage is the central axis of the carriage, and the gravity center of the carriage is lower than the rotating axis. An electrical locking mechanism for restricting the rotation of carriage is arranged between the carriage and the frame. The electrical locking mechanism is further connected to a vehicle tilting angle detector installed on the frame. The electrical locking mechanism acts as an actuator for the vehicle tilting angle detector. Under normal operating conditions, the carriage is locked by the electrical locking mechanism without rotation. In the event of tilting, the vehicle tilting angle detector can detect the tilting condition, and then output signal to the electrical locking mechanism, which releases the lock on the carriage allows it to be in free rotation state. In such case, as the gravity center of the carriage is lower than the rotating axis, the carriage is automatically kept in floor level no matter how much angle the entire vehicle is tilted or even rolled transversely.

As a further improvement, a set of protruding elastic button is arranged at both sides of the frame. The elastic buttons are extended into the frame and the extending side of the button is fixed with raised teeth. In addition, the raised teeth are also fixed onto the carriage correspondingly to the raised teeth of the buttons. When the vehicle is not tilted, the raised teeth of the buttons are disengaged from those of the carriage. When the vehicle is tilted and the left or right side of the carriage is tipped over the ground, the elastic buttons on the frame is squeezed and the raised teeth of the buttons and the carriage are forced to come into engagement to prevent the rotation of carriage, making it possible for the passengers to flee from the carriage.

The advantages of the present invention include: as compared with existing design for preventing the tilting of entire vehicle, the present invention can be easily implemented to protect the driver and passengers against the tilting accident as far as possible.

BRIEF DESCRIPTION OF THE DRAWINGS

FIG. 1: a structural view of the present invention;
FIG. 2: A-A sectional view of FIG. 1;
FIG. 3: B-B sectional view of FIG. 2;
FIG. 4: C-C sectional view of FIG. 1.

DETAILED DESCRIPTION OF THE INVENTION

Referring to FIG. 1, The vehicle with carriage anti-tilting structure comprises: a frame 1 and a carriage 2. The frame 1 is of cabinet structure. The carriage 2 is mounted into the frame 1. The carriage 2 is of cylindrical shape, with its central axis OO' in parallel along the length of the vehicle. FIG. 1 (including the following figures) depicts briefly the carriage 2 by a cylinder, while the seat and window not related to the present invention are neglected. Referring also to FIG. 2, roller 3 is fixed on the external wall of the carriage 2, and groove 4 is fixed on the inner wall of the frame 1, with the cross section of the groove 4 shown in FIG. 3. The roller 3 is inserted into the groove 4 and rolled along the groove 4, such that the carriage 2 and frame 1 can be connected rotarily, and the carriage 2 can be freely rotated. The rotating axis of the carriage is the central axis OO' of the carriage, and the gravity center of the carriage 2 is lower than the rotating axis, so that the carriage under free rotation can be automatically kept in its floor level.

An electrical locking mechanism for restricting the rotation of carriage is arranged between the carriage and frame. Referring to FIG. 1, said electrical locking mechanism comprises a magnet 5 fixed on the frame 1 and a fixed block 6 fixed on the carriage 2; the fixed block 6 is provided with a trough 7, and the magnet 5 is provided with an extensible pin 8, which can be inserted into the trough 7 of the fixed block to prevent the rotation of carriage. The magnet 5 is connected with a vehicle tilting angle detector installed on the vehicle; and the magnet 5 acts as an actuator of the detector. As soon as the tilting of the vehicle is detected by the vehicle tilting angle detector, the detector outputs signal to the magnet 5, which drives the pin 8 to retreat from the trough 7 of the fixed block, enabling free rotation of the carriage 2. The employing vehicle tilting angle detector can be selected from currently available tilting angle detectors. The vehicle tilting angle detector can be mounted at any position connected permanently with the frame.

As a further improvement of the present invention, referring to FIG. 4, a set of protruding elastic button 9 is arranged at both sides of the frame; the elastic buttons are extended into the frame and the extending side is fixed with raised teeth 10; moreover, raised teeth 11 are fixed onto the carriage correspondingly to the raised teeth of the buttons. Under normal vehicle operating condition, the raised teeth 10 of the buttons are disengaged from the raised teeth 11 of the carriage. When the vehicle is tilted, and the left or right side of the carriage is tipped over the ground, the elastic buttons 9 on the frame is squeezed and then the raised teeth 10 on the buttons are forced to come to engagement with the raised teeth 11 of the carriage to prevent the rotation of carriage, making possible for the passengers to flee from the carriage. The elastic force of the elastic buttons is provided by the spring 12 connected between the buttons and frame. When the buttons are not squeezed, the spring 12 can ensure the disengagement of the raised teeth 10 on the buttons from the raised teeth 11 of the carriage. The protruding portion of the elastic buttons is preferably made of rubber, thus serving as a buffer in the event of tilting of the vehicle.

The invention claimed is:
1. A vehicle with a carriage anti-tilting structure, comprising;
a frame;
a carriage having a cylindrical shape, with a central axis thereof being in parallel along a length of the vehicle, the carriage being connected with the frame and being adapted to freely rotate, a rotating axis of the carriage being the central axis of the carriage, a center of gravity of the carriage being lower than the rotating axis;

a vehicle tilting angle detector installed on the frame; and an electrical locking mechanism, for restricting a rotation of the carriage, arranged between the carriage and the frame, said locking mechanism being connected to the vehicle tilting angle detector and being actuated to restrict the rotation of the carriage based on a detected tilting by said vehicle tilting angle detector.

2. The vehicle with a carriage anti-tilting structure as claimed in claim 1, wherein each opposing side of the frame has a button disposed thereon, the buttons extending into the frame and having a plurality of raised teeth on an extending side, each button further having a spring that urges the raised teeth in a direction away from the carriage;

wherein the carriage has raised teeth fixed thereon which correspond to the raised teeth of the buttons; and wherein when the vehicle is not tilted, the raised teeth of the buttons are disengaged from the raised teeth of the carriage due to the urging of the springs.

* * * * *